Sept. 13, 1966          J. J. MANNO ETAL          3,271,894
                        HEAD FOR SHELLFISH TRAP
                        Filed Oct. 9, 1964

INVENTORS
JOSEPH J. MANNO
NILS C. SCHULTZ
BY
Knox & Knox

United States Patent Office 3,271,894
Patented Sept. 13, 1966

3,271,894
HEAD FOR SHELLFISH TRAP
Joseph J. Manno, 7450 Girard Ave., San Diego, Calif., and Nils C. Schultz, 5618 Taft Ave., La Jolla, Calif.
Filed Oct. 9, 1964, Ser. No. 402,702
5 Claims. (Cl. 43—65)

The present invention relates to traps for shellfish such as lobsters, crayfish and the like and, more particularly to a new and improved head for use with such traps.

A popular form of lobster trap usually comprises a wooden frame structure including a plurality of spaced wooden slats. Openings are provided in either the sides or ends of the trap for the entrance of lobsters into the trap. A generally conical or funnel shaped net is mounted in each of these openings to provide entrance ramps for the lobsters. These nets are commonly referred to as "heads" and are generally comprised of netting woven from suitable size cord.

The weaving of the netting for these heads requires considerable skill as well as time. The heads must be securely fastened in the trap, with the net being drawn taut in all directions to eliminate slack. Correspondingly, the replacement of heads is a relatively time-consuming operation. Such head replacement usually requires that the trap be returned to shore, thus resulting in loss of fishing time with an attendant economic loss.

It is the primary object of this invention to provide an improved head for shellfish traps and particularly for lobster traps which may be quickly and easily applied to the traps.

It is a further object of this invention to provide an improved head for lobster traps which will have a long life in salt water.

It is a still further object of this invention to provide an improved head for a lobster trap which head is constructed of flexible fingers arranged in frusto-conical form and which will readily yield to permit the entrance into the trap of lobsters of a wide variety of sizes.

Finally, it is an object to provide a shellfish trap having a head of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Figure 1:
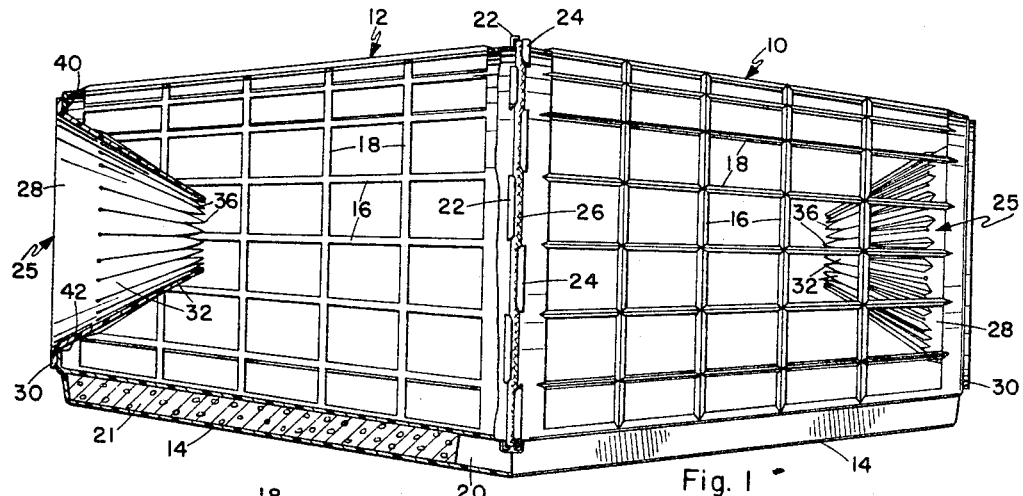
FIGURE 1 is a side elevational view, partly in section, of a representative lobster trap having the improved heads in place therein.
Figure 2:
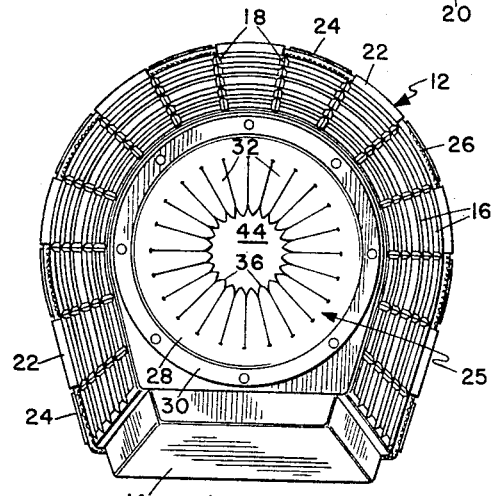
FIGURE 2 is an end elevational view as taken from the left end of FIGURE 1.

In FIGURE 1 there is shown a representative form of lobster trap with the improved heads installed therein. The trap consists of two similar enclosure members 10 and 12 of generally frusto-conical shape, the bottoms of which are flattened as clearly shown at 14 in FIGURE 2. The side walls and top of the trap are formed of a plurality of longitudinally extending slats 16 and transversely extending slats 18 joined at their intersecting portions, as clearly shown, while the bottom 14 is provided with a compartment 20 which is substantially filled with a weighted material 21, such as concrete. This ballast material is heavy enough to insure that the trap remains right side up on the ocean floor under all conditions.

The large ends of the members 10 and 12 are provided with a plurality of circumferentially spaced lugs 22 and 24, respectively, which are positioned in interdigitating relationship when the members 10 and 12 are assembled, as clearly shown in FIGURE 1. A rope 26 or other flexible member is wound around the circumference of the trap and engages the fingers 22 and 24 to prevent separation of the members 10 and 12.

Figure 3:
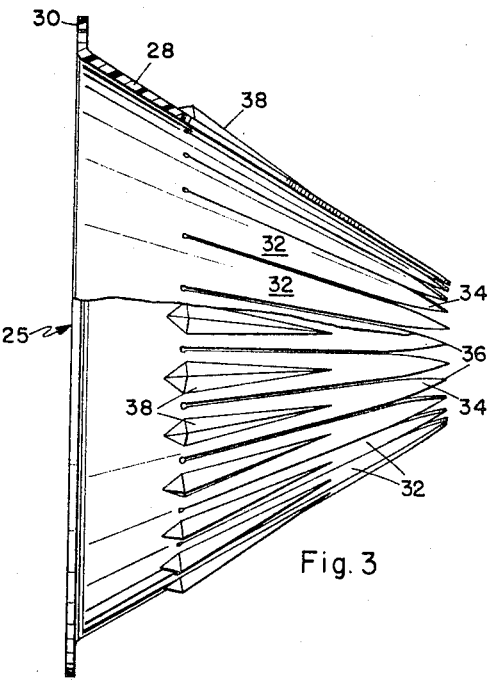
FIGURE 3 is an enlarged side elevational view of one form of head member, partly in section.

The improved heads 25 which form the subject matter of this invention are mounted in openings in the distal or small ends of the members 10 and 12. These heads are also of generally frusto-conical shape and so arranged as to form a funnel-shaped opening leading into the interior of the trap. Each head consists of an imperforate, tapered body portion 28 from the large diameter end of which extends a securing flange 30. Unitary with the smaller end of the body portion 28 are a series of closely spaced resilient fingers 32 which converge inwardly and, as exemplified in the drawing, extend at the same angle of taper as the body portion 28. If desired, the inner ends of the fingers 32 may be reduced in width as at 34 to form points 36. The fingers may also be provided with a reinforcing boss 38 on the outer surface thereof. This boss may taper from a maximum thickness adjacent the junction of the fingers with body 28 to a point approximately midway of the length of the fingers as clearly shown in FIGURE 3 thus minimizing flexure of the root portions of the fingers.

The smaller ends of the enclosure members 10 and 12 as shown in FIGURE 1 are provided with a mounting flange 40, only one of which is shown, defining a central opening 42. Flange 30 of the head member is positioned against mounting flange 40 with the fingers 32 extending inwardly. Flanges 30 and 40 are secured by any suitable means such as rivets, screws, bolts or the like.

The fingers 32 may be of any desired length determined to some degree by the size of the opening 44. This opening 44 is of a size to accommodate the average size of lobster and the fingers are sufficiently flexible to yield readily to permit the entrance of larger lobsters. The inherent resiliency of the fingers permits them to spring back after passage of the lobster to reduce the size of the opening and prevent the escape of at least the larger lobsters trapped therein.

The enclosure members 10 and 12 and the heads 25 may be made from any suitable material but we prefer to use a non-metallic synthetic material such as polyvinyl plastic. We have found that this material has a high abrasive resistance and is unaffected by the action of salt water. Furthermore, it will yield readily without rupture when subjected to severe impacts.

Figure 4:
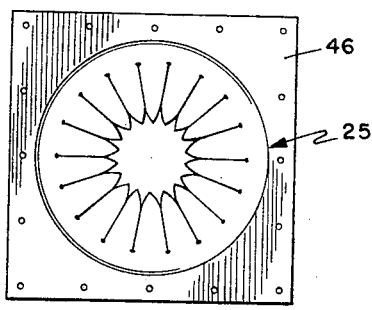
FIGURE 4 is an end view of a modified form.

In FIGURE 4 we have shown a modification of head members 25 which may be applied to existing traps as a replacement head. This is generally similar to that shown in FIGURE 3 except that the mounting flange 46 is square rather than round.

While we have shown our improved heads applied to a trap of generally double frusto-conical formation, it should be understood that the heads 25 can be used with traps of varying shapes such as square, triangular or rectangular, the only requirement being that a flat mounting flange similar to the flange 40 be provided, of the corresponding shape and dimension, on which to mount the flange 46.

It is understood that minor variation from the form of the invention disclosed herein may be made without departure from the spirit and scope of the invention, and that the specification and drawing are to be considered as merely illustrative rather than limiting.

We claim:
1. A head for a shellfish trap comprising:
a frusto-conical body portion having a mounting flange extending radially from the large diameter end thereof; and a plurality of closely spaced flexible fingers on the smaller diameter end of said body portion and converging inwardly to define a relatively small diameter throat, said fingers having integral bosses providing reinforcement against flexure throughout a portion of their length adjacent the body portion.

2. The structure of claim 1 in which said head is formed of non-metallic material, such as polyvinyl plastic.

3. A shellfish trap comprising two similarly tapered enclosure members having large ends and small ends, the large ends abutting each other and having interdigitating lugs; a flexible linear member wound around the trap and engaging said lugs to prevent separation of the enclosure members; said small ends having openings therein, a head secured generally about each of said openings and each head comprising a frusto-conical body portion having a mounting flange extending radially from the large diameter end thereof for attachment to said wall; and a plurality of closely spaced flexible fingers converging inwardly to define a relatively small diameter throat.

4. The structure of claim 3 in which said fingers are reinforced throughout a portion of their length adjacent the body portion.

5. The structure of claim 4 in which said head is formed of non-metallic material such as polyvinyl plastic.

References Cited by the Examiner

UNITED STATES PATENTS

| | | | |
|---|---|---|---|
| 311,346 | 1/1885 | McKinney | 43—65 X |
| 748,201 | 12/1903 | Miller | 43—65 |
| 2,076,972 | 4/1937 | Tucker | 43—65 |
| 2,490,180 | 12/1949 | Varnedoe | 43—65 |
| 2,950,562 | 8/1960 | Lothrop | 43—102 |

OTHER REFERENCES

Popular Mechanics Magazine, Vol. 101, No. 3, March 1954, page 148.

SAMUEL KOREN, *Primary Examiner.*

W. H. CAMP, *Assistant Examiner.*